(12) United States Patent
Chowdhury et al.

(10) Patent No.: US 6,498,877 B1
(45) Date of Patent: Dec. 24, 2002

(54) TUNABLE OPTICAL FIBER BRAGG AND LONG PERIOD GRATING

(75) Inventors: Dipakbin Q. Chowdhury, Corning, NY (US); Kevin B. Sparks, Corning, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/623,406
(22) PCT Filed: Mar. 16, 1999
(86) PCT No.: PCT/US99/05570
§ 371 (c)(1), (2), (4) Date: Sep. 5, 2000
(87) PCT Pub. No.: WO99/50699
PCT Pub. Date: Oct. 7, 1999

Related U.S. Application Data
(60) Provisional application No. 60/079,873, filed on Mar. 30, 1998.

(51) Int. Cl.[7] .............................. G02B 6/34; H04J 14/02
(52) U.S. Cl. ............................... 385/37; 385/2; 385/12; 385/123; 385/124; 385/127; 359/127; 359/130
(58) Field of Search .................. 385/37, 12, 2, 385/123, 124, 127, 128; 359/127, 130

(56) References Cited

U.S. PATENT DOCUMENTS

| | | | | |
|---|---|---|---|---|
| 5,007,705 | A | | 4/1991 | Morey et al. ................. 385/12 |
| 5,459,799 | A | * | 10/1995 | Weber ............................ 385/2 |
| 5,694,501 | A | | 12/1997 | Alavie et al. ................. 385/37 |
| 5,699,468 | A | | 12/1997 | Farries et al. ............... 385/140 |
| 5,812,711 | A | | 9/1998 | Glass et al. .................. 385/37 |
| 6,058,226 | A | * | 5/2000 | Starodubov ................. 385/12 |
| 6,366,721 | B1 | * | 2/2002 | Hu et al. ..................... 385/37 |

* cited by examiner

*Primary Examiner*—Georgia Epps
*Assistant Examiner*—M. Hasan
(74) *Attorney, Agent, or Firm*—Svetlana Z. Short; Kevin A. Oliver

(57) ABSTRACT

Disclosed is a tunable optical filter which may be used in telecommunications systems. The filter comprises a single mode optical waveguide containing a grating. The resonance wavelength of the filter is changed by changing the boundary condition at the interface between the cladding layer and an additional layer applied to the outer cladding layer surface. This boundary condition is changed by changing the refractive index of the additional layer. Means for changing the refractive index of the additional layer include establishing a structural resonance in the additional layer, or forming the additional layer from electro-optic or piezoelectric materials.

29 Claims, 4 Drawing Sheets ially perturbed waveguide for electromagnetic
TUNABLE OPTICAL FIBER BRAGG AND LONG PERIOD GRATING This application is based upon the provisional application Ser. No. 60/079,873, filed Mar. 30, 1998, which we claim as the priority date of this application.

BACKGROUND OF THE INVENTION

The invention is directed to an optical filter which is tunable, i.e. adjustable, with regard to the center wavelength characterizing the filters spectral response. In particular, the subject filter is preferably tuned by either optical or electrical means.

Optical filters have become essential components in wavelength multiplexed communications systems and in systems which use optical amplifiers. Such filters are used as elements to add or drop a selected wavelength and so may be used to block broadband noise while passing a signal, to flatten optical amplifier gain, or to direct a signal of particular wavelength into pre-selected nodes. Greater system flexibility can be achieved using filters whose wavelength response is tunable over a range of wavelengths.

A number of alternative filtering devices are known including, Fabrey-Perot or Mach-Zehnder interferometers, multiple layer dielectric film filters, and filters based on waveguide Bragg or long period gratings. Tuning of these devices may be accomplished by means that change the device refractive index or dimensions. For example straining a device, by bending or stretching a device or a portion thereof, can serve to alter both dimensions and refractive index. In a similar way, dimensions or index may be altered by altering the temperature of a device or a portion thereof. Thermo-electric cooling and heating is a convenient way to carry out thermal adjustment of a device. In addition, optical or electrical means can be used to alter device dimensions or refractive index and thus the device filtering characteristics. These latter means are usually preferred because they provide a filter having a faster response, and which is more reliable, and afford more reproducible control of the device, as compared to devices tuned by mechanical or thermal means.

There is therefore a need in the art for a tunable filter device having:

rapid response to a tuning means;

a high degree of reliability; and, a high degree of reproducibility.

DEFINITIONS

An optical fiber grating is a periodically or quasi-periodically perturbed waveguide for electromagnetic radiation, the grating, i.e., the perturbation having a preselected length along which the refractive index or the profile of the waveguide changes periodically.

The period of a grating is the distance between corresponding points in two nearest neighbor high or low refractive index portions of the grating.

A long period grating is one that provides a resonance between cladding modes and a core mode propagating in the same direction.

A structural resonance occurs when electromagnetic waves, such as light, bounce around within a structure because of total or near-total internal reflection from a boundary between a high and a low index region and comes back on itself in phase after a single or multiple reflections. Fabrey-Perot interferometers are the simplest example of one dimensional structural resonance. For structural resonance to occur in a waveguide in the transverse plane, the waveguide must be surrounded by a medium of lower refractive index than that of the waveguide. In a circular waveguide, such as an optical fiber, structural resonance occurs within the cladding region because of the total internal reflection at the clad-air or clad-jacket interface. In the case of optical fiber, light incident substantially normal to the usual direction of propagation gets totally internally reflected by the clad-air or clad-jacket interface and at certain wavelengths after many such reflections comes back on itself in phase to constructively interfere and hence cause a structural resonance. (A good reference for this is: S. C. Hill & R. E. Benner, "Morphology Dependent Resonances", in P. W. Barber R. K. Chang eds. "Optical Effects Associated With Small Particles", World Scientific (New Jersey. 1988)). FIG. 5 shows an example of structural resonance that can occur in an additional layer surrounding and in contact with the cladding layer of an optical waveguide. In this example, a laser is used to direct light into the layer in a direction substantially perpendicular to the layer surface, The structural resonance of the incident light which occurs in the layer changes the intensity dependent term of the refractive Index of the layer and so changes the peak wavelength filtered by an associated grating.

A Bragg grating is one which produces a resonance between a core mode and a counter-propagating, reflected core mode.

Throughout this document the term waveguide is taken to mean single mode waveguide unless expressly stated otherwise.

SUMMARY OF THE INVENTION

The tunable filtering device of this application meets the need for high performance tunable filters by providing an optically or electrically controlled long period or Bragg grating device.

A first aspect of the invention is a tunable optical filter which includes a single mode optical waveguide having a grating impressed upon at least a portion of the waveguide core. The tunability derives from an additional layer applied to the outer surface of the waveguide clad layer. This additional layer is made of a material whose refractive index may be changed by a control mechanism which acts upon the additional layer. Changing the refractive index of this outermost layer, changes the boundary conditions of the electromagnetic fields propagated in the waveguide. This change in boundary conditions will affect the propagation constant of the cladding modes. Depending upon the distance of the additional layer from the core-clad boundary, the change in refractive index of the additional layer may also affect the propagation constant of the core mode. For a typical single mode waveguide this distance is in the range of about 5 μm to 10 μm. The resonance wavelength of the grating depends directly upon the propagation constants of the resonating modes; Thus, changing the propagation constant effectively changes the resonance wavelength of the grating, effectively tuning the resonant peaks of the grating.

An embodiment of the tunable filter has an additional layer which is electro-optic, for example $LiNbO_3$. The refractive index of the layer can then be changed rapidly and reproducibly by means of a voltage applied across the layer. The applied voltage effectively changes the propagation constant of the cladding mode and thus changes the resonant wavelength peaks of the grating. This is one embodiment of the long period grating.

In a preferred embodiment of this aspect of the invention, a structural resonance is established in the additional layer by directing light from one or more light sources onto the layer, the direction of travel of the incident light being transverse to the long dimension of the layer. At structural resonance, light intensity becomes more concentrated in the layer. The light intensity changes the intensity dependent term of the refractive index of the layer and so changes the propagation constant of a cladding mode. The intensity dependent term is commonly called the non-linear refractive index term. One writes the refractive index as $n=n_1+n_2 l$, in which $n_1$ is the linear index, l is light intensity and $n_2$ is the nonlinear index coefficient. The grating is effectively tuned from one wavelength peak to another by controlling the incident light intensity. A typical light source is one or more lasers which direct light into the additional layer in a direction transverse to the long dimension of the layer.

As the non-linearity coefficient $n_2$ of the material of the additional layer increases, the structural resonance induced index change in the additional layer is greater, so that the effect of the change in the additional layer on the propagating modes, either cladding or core, becomes greater. A typical non-linearity coefficient of a dispersion shifted waveguide is about $2.3 \times 10^{-20}$ $m^2/W$.

The effectiveness of the additional layer, as measured by the width of the tuning band, is expected to be enhanced in layer materials having a relatively higher nonlinear coefficient. The inventors contemplate coefficients on the order of at least 10–19 at this time. Profiles designed to increase non-linear index coefficient are under study for example in co-pending provisional application No. 60/071732 incorporated herein by reference. A typical tuning band width is in the range of about 70 $\mu$m. Thus, a preferred embodiment of an additional layer, in which structural resonance is to be established, is an additional layer comprising a material having a non-linearity coefficient in the range of about $10^{-20}$ $10^{-19}$ $m^2/W$.

In yet another embodiment of the novel tunable filter, the additional layer comprises a dye doped silica glass. The refractive index of such a dye doped glass may be changed by launching light transversely into the glass, thereby tuning the wavelength of the filter.

To avoid interaction of the transversely launched light with the signal light propagating in the waveguide, the wavelength of light, used to change the refractive index of the additional layer by means of structural resonance or interaction with a dye, is preferably outside the range of about 1300 nm to 1700 nm, which is an operating band of optical communication systems.

In yet another embodiment of the tunable filter, the additional layer comprises a piezoelectric material, for example the material may be a soft polymer. The density of the material, and thus the refractive index of the material, can be changed by applying a voltage across the material, thereby tuning the grating to a different resonance wavelength.

In an embodiment of this first aspect of the novel tunable filter, In which the boundary of additional layer is sufficiently close to the mode propagating in the core to change the propagation constant thereof, as is noted above, the grating period may be chosen to be that of a Bragg grating, In a second aspect of the invention, the waveguide, having a core and a clad and an additional outermost layer, contains a grating of period $\Lambda_g$ which is chosen such that the difference in the propagation constant of a cladding mode, $\beta_{cl}$, and the propagation constant of a core mode, $\beta_c$, are related by the equation $\beta_{cl}-\beta_c=2\pi/\Lambda_g$, the condition which defines resonance between the modes. Then the filter may be tuned by changing $\beta_{cl}$. The $\beta_{cl}$ may be changed by changing the refractive index of the additional layer by any of the means noted above.

In a third aspect of the novel tunable filter, the grating constant may be chosen as $\Lambda_b$, a constant appropriate for Bragg grating. The resonance which is established is then governed by the equation, $\beta_r-\beta_c=2\pi/\Lambda_b$, where $\beta_r$ is a reflected mode. In this aspect, the filter is tuned by changing $\beta_c$. Thus the thickness of the cladding layer much be chosen small enough to allow interaction between the core mode and the additional layer-cladding layer boundary. Then $\beta_c$ may be changed by changing the refractive index of the additional layer by any of the means noted in the first or second aspect of the invention.

DETAILED DESCRIPTION OF THE INVENTION

Figure 1:
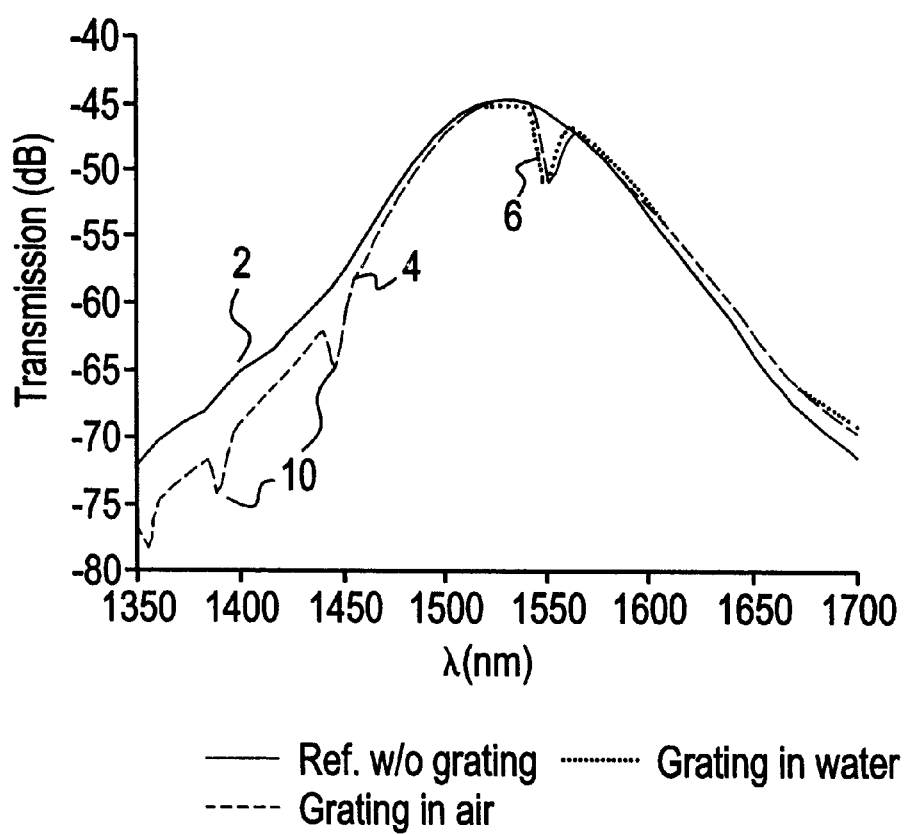
FIG. 1 is a chart of a data set which demonstrates the effect on a long period grating resonance of a change of the refractive index of the additional layer.

High bit rate telecommunication links, for example those which make use of wavelength division multiplexing or optical amplifiers, require effective means for filtering a wavelength or a band of wavelengths. Further, in many applications, for example those which involve two way communication or multi-channel delivery to a node, the wavelength which is to be passed or filtered changes with time. Thus the need exists for a filter whose characteristic wavelength may be changed, i.e., tuned over a reasonably broad band of wavelengths. The tuning bandwidth of the present invention is in the range of about 70 $\mu$m.

In the present invention, the filtering properties of waveguide gratings are used together with means to change the resonance wavelength of the grating to provide just such a tunable wavelength filter. The resonance wavelength may be changed by changing the dimensions of the grating, for example the spacing of regions of high and low refractive index. As an alternative, the resonance wavelength may be changed by changing the refractive index of the base glass containing the grating. Hence a waveguide grating may be tuned by applying stress to the waveguide and so changing its refractive index. Also, the change of refractive index with temperature may be used to alter the resonance condition. However, in cases in which response time is important or a high degree of reliability and reproducibility are required, an alternative to mechanical or thermal tuning of the grating is needed. The novel tunable grating of this invention alters the grating resonance by changing the propagation constant of pre-selected modes in the waveguide. The propagation constant of a waveguide is found by solving the wave equation for the potential using boundary conditions appropriate to the particular geometry and materials of the waveguide. For example, in the case of a waveguide fiber having a core, a clad and a coating, the wave equation may be written in cylindrical coordinates and solved such that the solution field and its first derivative satisfy the usual conditions at the interfaces of core and cladding and cladding and coating. The coating may be another glass or a polymer. Also, additional layers of glass or polymer may be added to protect the waveguide from mechanical damage or impart to the waveguide additional desired properties.

The grating may be configured as a Bragg grating in which case the resonance occurs between a forward propagating wave and a wave that has been reflected by the grating. As an alternative, the grating may have a long period spacing in which case the resonance occurs between a forward wave propagating in the waveguide core and a forward wave propagating in the waveguide cladding. In terms common in the art, the resonance occurs between a core mode and a cladding mode which are propagating in the same direction. The condition for resonance in this latter case is that the difference in propagation constant of the core and cladding mode equal $2\pi$ times the inverse of the grating period. That is, $\beta_{cl}-\beta_c=2\pi/\Lambda_g$, where the $\beta$'s are the respective cladding and core more propagation constants and $\Lambda_g$ is the grating period.

Given this condition, the grating may be tuned by changing one or both of the propagation constants. The Bragg grating, which has an analogous resonance condition may be tuned by changing the core mode propagation constant. The problem of providing a tunable filter which has a fast response time and which is reliable and reproducible has been reduced to the problem of finding fast and reliable means for changing the propagation constant of the core or cladding modes in the waveguide. Changing the refractive index of the outer layer serves to change the solution to the wave equation which describes the fields in the waveguide and so change the propagation constant associated with modes propagating in a particular region of the waveguide, i.e., the core or the cladding or both.

In FIG. 1 is illustrated the effect of changing the index at the outer surface of the clad layer. The solid curve 2 is a chart of the transmission characteristics of the waveguide versus wavelength. The dashed curve 4 shows the filtering effect produced by forming a long period grating in the waveguide, Curve 4 was measured in the case in which the outer clad surface was bounded by air. The waveguide containing the grating was then immersed in water and the transmission curve 6 was measured, Note that the change in index at the outer clad surface shifted the filtered wavelength downward by about 2 nm as compared to the filtered wavelength of curve 4.

Because the distance between the clad surface and the core to clad interface was large relative to the signal wavelength in this case, the propagation constant of the core mode was substantially unaffected by the change in outer Clad surface boundary condition. The change in index served to change the propagation constant of one or more cladding modes and so change the resonant wavelength of the grating. The shift can be seen more clearly in inset 8 of FIG. 1. Because there is no apparent shift for the lower wavelength resonances 10, it is probable that the index change affected a single cladding mode.

Figure 2:
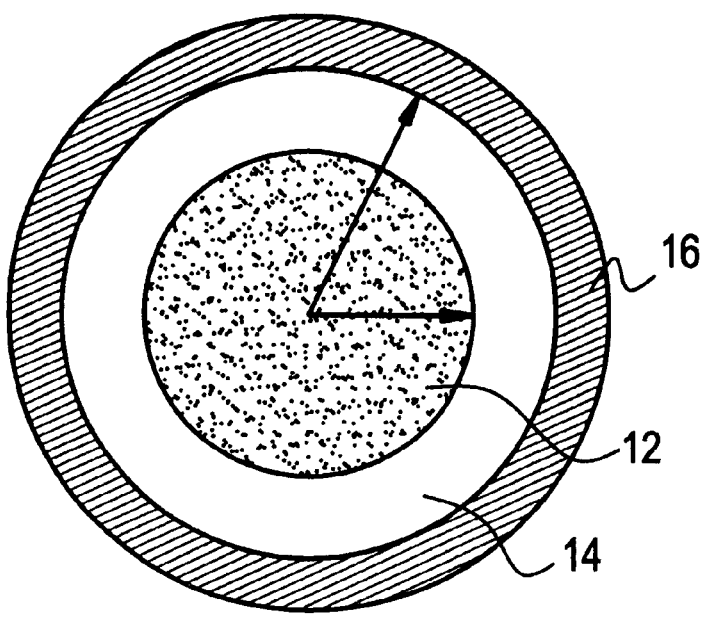
FIG. 2 is a cross sectional view of an optical waveguide fiber having the additional layer.

The cross sectional view in FIG. 2 of a waveguide fiber, having a grating, in accordance with the present invention, shows the core region 12 surrounded by the cladding layer 14. An additional layer 16 is formed about the outer surface of cladding layer 14. In this configuration, a change in the refractive index of additional layer 16, changes the boundary conditions of the propagated fields and so changes the propagation constant and the resonant wavelengths of the grating. Depending upon the amount of refractive index change in the additional layer 16 and the spacing between layer 16 and core 12, the changing of the refractive index in additional layer 16 can change the propagation constant of core as well as cladding modes. It will be understood that the cross sectional drawings are not to scale.

Figure 2A:
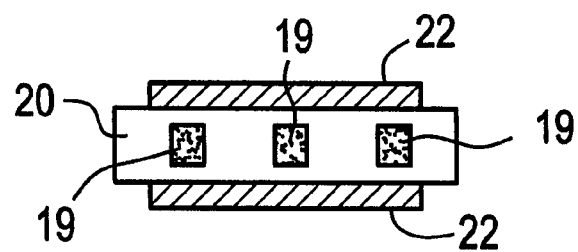
FIG. 2a is a cross sectional view of an alternative waveguide shape.

An alternative embodiment of the tunable filter is shown in FIG. 2a. In this embodiment the rectangular shaped cores 19 are embedded in cladding layer 20. The propagation constant of modes in cladding layer 20 is changed in refractive index of additional layers 22. As before, the influence the additional layer has upon cladding modes depends upon the amount of refractive index change. The influence of the additional layer on the core modes depends upon the amount of the index change and the spacing between cores 19 and additional layer 22.

To increase the effect of the additional layer on the core modes, the cladding layer thickness can be reduced, either during manufacture of the waveguide cladding or by etching or grinding or otherwise reducing the cladding layer thickness after the cladding layer has been formed. In order for the additional layer to affect the core modes, the spacing between core-cladding interface and cladding-additional layer interface is in the range of about 5 $\mu$m to 10 $\mu$m.

Figure 3:
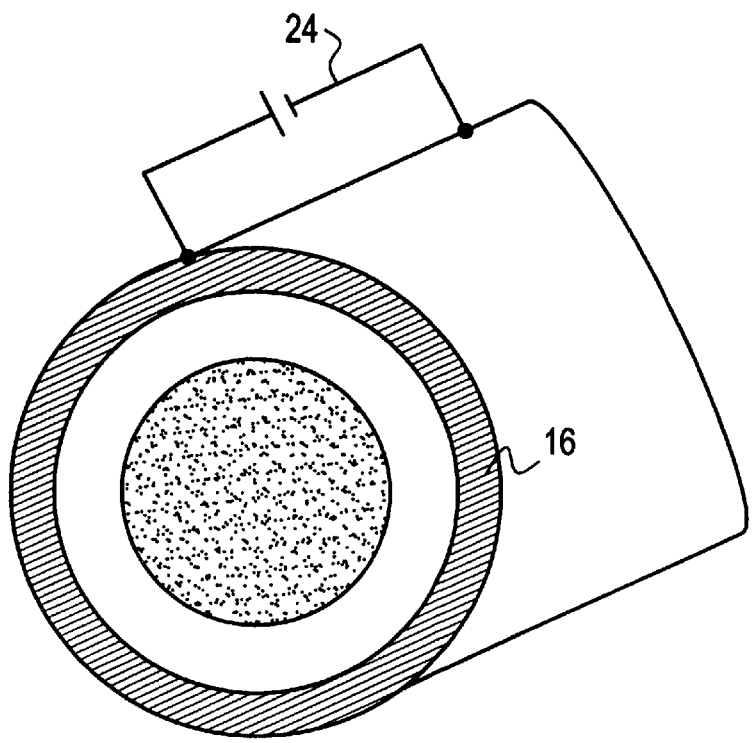
FIG. 3 is a cross sectional view of a waveguide fiber having the additional layer and an voltage applied to a length of that layer that layer.

Additional layers that change density or otherwise change refractive index under the influence of an electric field are contemplated. In FIG. 3 is shown additional layer 16 having a voltage applied by electrical circuit 24 along a portion of its length. Given the proper choice of material, layer 16 will change refractive index as the applied voltage is changed. The change in refractive index in turn changes the boundary condition at the cladding outer surface and so changes the propagation constant of one or more cladding or core modes, thereby providing a tunable grating. A different view of the applied voltage across the longer dimension of the additional layer 16 is shown as circuit 26 in FIG. 4.

Figure 4:
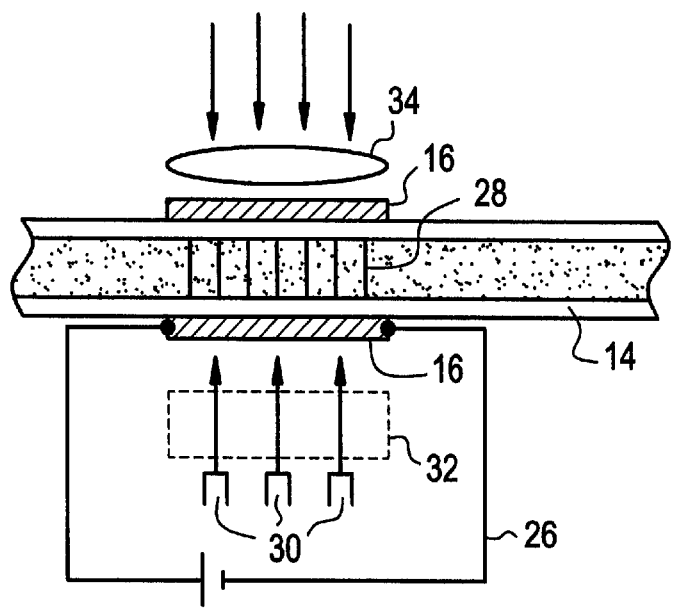
FIG. 4 is a cross sectional view containing the long axis of a waveguide fiber having the additional layer together with means for exciting a structural resonance.

Another embodiment, one in which a structural resonance is established in layer additional 16, is illustrated in FIG. 4. In this embodiment, the difference in refractive index between cladding layer 14 and additional layer 16 is large enough to produce total internal reflection of light incident on the outer surface of the additional layer and refracted into the additional layer. As previously discussed, the structural resonance concentrates light intensity in the additional layer 16 and changes the nonlinear refractive index of the additional layer, thereby providing a tunable grating, indicated schematically by the lines 28. Note that individual segments of the grating need not alternate symmetrically. Apodization techniques, which involve superimposing a broad index envelope along the grating length, may be used. Light sources 30 in FIG. 4 may pass through an optical element 32 which may serve, for example, to distribute light intensity evenly along the additional layer. Sources 30 could be lasers for example. The optical element between the light source and the additional layer may be a lens as illustrated by object 34 in FIG. 4.

Figure 5:
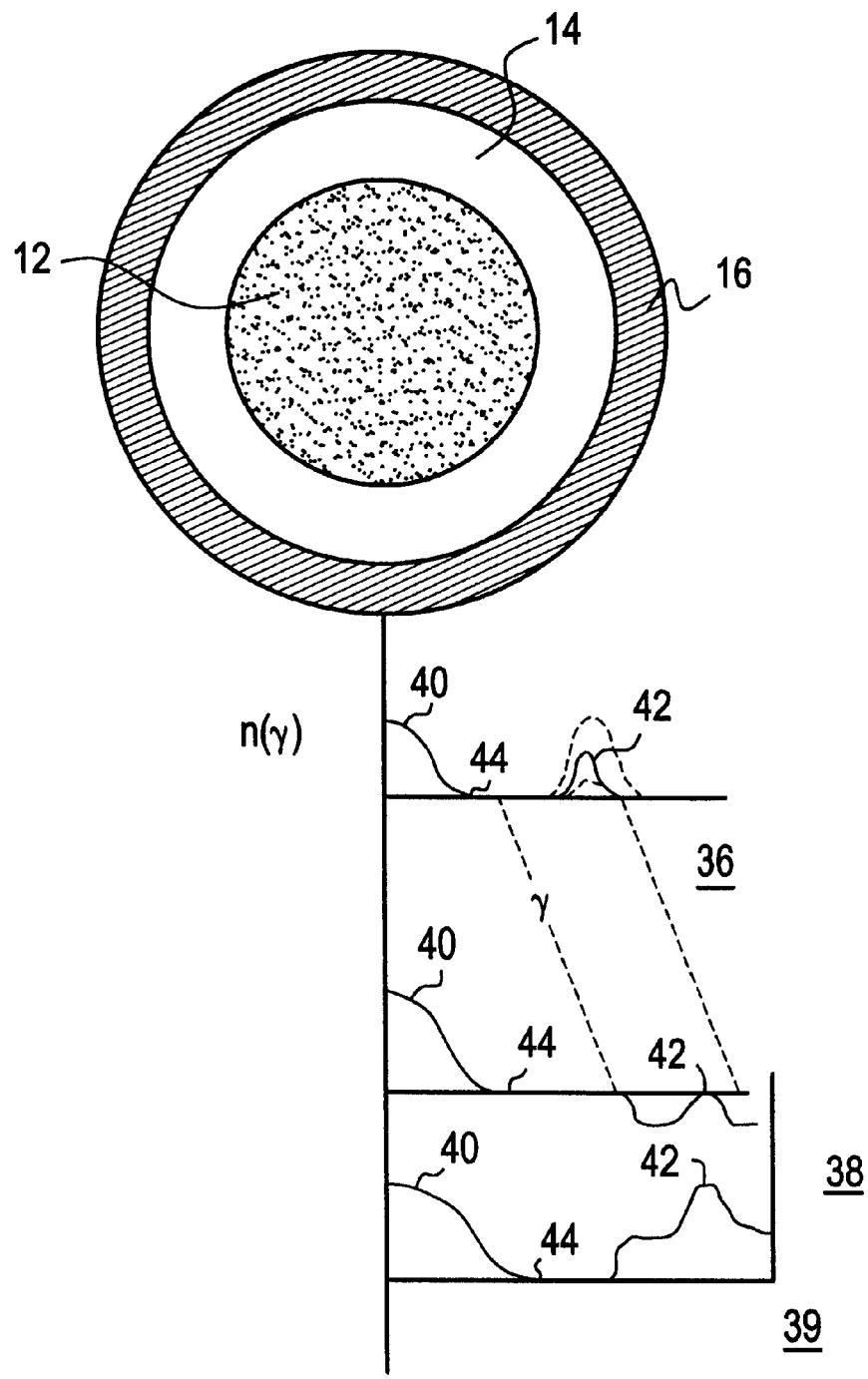
FIG. 5 is a cross sectional view of the waveguide containing the grating. The effect of structural resonance on the nonlinear index of refraction is illustrated.

The relative indexes of the materials abutting the layer 16, which result in structural resonance, are further illustrated in FIG. 5. Clad layer 14 abuts the inside surface of layer 16. The clad layer may have a refractive index equal to, less than, or greater than that of layer 16 as shown in respective index diagrams, i.e., charts of refractive index versus radius, 36, 38 and 39 of FIG. 5. The refractive index of the material or vacuum abutting the outside surface of layer 16 must have an index lower than that of layer 16. The raised index of the core region 12 is shown as curves 40 in the index diagrams. The light intensity dependent portions of the index are shown as curves 42. In the case shown, the clad layer index is illustrated as horizontal portions 44.

It will be understood that the invention includes combinations of means for changing the refractive index of the additional layer. For example, additional layer 16 could comprise a piezoelectric polymer. A voltage could be impressed across the polymer layer, thereby changing its refractive index, and a structural resonance using a light source could also be employed.

Although particular embodiments of the invention are hereinabove disclosed and described, the invention is nonetheless limited only by the following claims.

We claim:

1. A tunable optical filter comprising:
   a single mode optical waveguide comprising a core region having a length and a cladding layer contiguous to the core region, the core region length having a sequence of adjacent sublengths which make up at least a portion of the core length, the sequence of sublengths having alternating higher and lower refractive index to form a grating, the grating having an optional apodization envelope;
   an additional layer contiguous to the cladding layer and extending along the cladding layer for at least a portion of the sequence of sublengths which form the grating, the additional layer comprising a material having a refractive index and a non-linearity coefficient in the range of about $10^{-20}$ to $10^{-19}$ $m^2/W$; and,
   means for changing the refractive index of the additional layer.

2. The tunable optical filter of claim 1 in which the grating is a long period grating.

3. The tunable optical filter of claim 2 in which the additional layer is an electro-optic material and the means for changing the refractive index of the additional layer is the application of a voltage across the additional layer.

4. The tunable optical filter of claim 3 in which the electro-optic material is $LiNbO_3$.

5. The tunable optical filter of claim 2 in which the additional layer comprises a material having a light intensity dependent refractive index, the outer surface of the layer surrounded by a material of refractive index lower than that of the outer layer to provide for structural resonance in the additional layer, the structural resonance being induced by directing a light source into the additional layer in a direction transverse to the direction along which the additional layer extends.

6. The tunable optical filter of claim 2 in which the additional layer comprises a dye doped silica glass and the means for changing the refractive index of the additional layer is laser light launched into the additional layer in a direction transverse to the direction along which the additional layer extends, the laser wavelength selected to interact with the dye.

7. The tunable optical filter of claim 6 in which the wavelength of the laser light is outside the wavelength range of about 1300 nm to 1700 nm, which is an operating band of optical communication systems.

8. The turnable optical filter of claim 2 in which the additional layer is a polymer which exhibits a piezo-electric effect and the means for changing the refractive index of the additional layer is a voltage applied across the polymer to change the density thereof.

9. The tunable optical filter of claim 1 in which the grating is a Bragg grating.

10. The tunable optical filter of claim 9 in which the additional layer comprises a material having a non-linearity coefficient in the range of about $10^{-20}$ to $10^{-19}$ $m^2/W$.

11. A tunable optical filter comprising:
    an optical waveguide comprising a core region having a length and a cladding layer contiguous to the core, the core region having a sequence of adjacent sublengths which make up at least a portion of the core length, the sequence of sublengths having alternating higher and lower refractive index to form a grating having a period $A_g$, the grating having an optional apodization envelope, in which, the core has an associated propagation constant and the clad layer has an associated propagation constant $B_{cl}$ and $B_{cl}-B_c=2\pi/A_g$; and,
    means for changing $B_{cl}$.

12. The tunable optical filter of claim 11 in which the means for changing $B_{cl}$ comprises, an additional layer contiguous to the cladding layer and extending along the cladding layer for at least a potion of the sequence of sublengths which form the grating, the additional layer comprising a material having a refractive index; and, means for changing the refractive index of the additional layer.

13. The tunable optical filter of claim 12 in which the additional layer is an electro-optic material and the means for changing the refractive index of the additional layer is the application of a voltage across the additional layer.

14. The tunable optical filter of claim 13 in which the electro-optic material is $LiNbO_3$.

15. The tunable optical filter of claim 12 in which the additional layer comprises a material having a light intensity dependent refractive index, the outer surface of the layer surrounded by a material of refractive index lower than that of the outer layer to provide for structural resonance in the additional layer, the structural resonance being induced by directing a light source into the additional layer in a direction transverse to the direction along which the additional layer extends.

16. The tunable optical filter of claim 15 in which the additional layer comprises a material having a non-linearity coefficient in the range of about $10^{-20}$ to $10^{-19}$ $m^2/W$.

17. The tunable optical filter of claim 12 in which the additional layer comprises a dye doped silica glass and the means for changing the refractive index of the additional layer is laser light launched into the additional layer in a direction transverse to the extend of the additional layer, the laser wavelength selected to interact with the dye.

18. The tunable optical filter of claim 17 in which the wavelength of the laser light is outside the wavelength range of about 1300 nm to 1700 nm, which is an operating band of the optical communication systems.

19. The tunable optical filter of claim 12 in which the additional layer is a polymer which exhibits a piezo-electric effect and the means for changing the refractive index of the additional layer is a voltage applied across the polymer to change the density thereof.

20. A tunable optical filter comprising:
    an optical waveguide comprising a core region having a length and a cladding layer contiguous to the core to forma core-clad interface, the core region having a sequence of adjacent sublengths which make up at least a portion of the core length, the sequence of sublengths having alternating higher and lower refractive index to form a grating having a period $A_b$, the grating having an optional apodization envelope, in which, the core has an associated propagation constant $B_c$ for light propagating in a first direction in the waveguide and an associated propagation constant $B_r$ and $B_r - B_c = 2\pi/A_b$, and, means for changing $B_c$.

21. The tunable filter of claim 20 in which the means for changing $B_c$, comprises, an additional layer contiguous to the cladding layer forming a clad-additional layer interface, which has a thickness, and extending along the cladding layer for at least a portion of the sequence of sublengths which form the grating, the additional layer comprising a material having a refractive index; and, means for changing the refractive index of the additional layer, the cladding layer thickness being pre-selected so that a change in refractive index of the additional layer produces a change in $B_c$.

22. The tunable optical filter of claim 21 in which the additional layer is an electro-optic material and the means for changing the refractive index of the additional layer is the application of a voltage across the additional layer.

23. The tunable optical filter of claim 22 in which the electro-optic material is $LiNbO_3$.

24. The tunable optical filter of claim 21 in which the additional layer comprises a material having a refractive index sufficiently lower than the refractive index of the cladding layer to provide for structural resonance in the additional layer, the structural resonance being induced by directing a laser beam into the additional layer in a direction transverse to the direction in which the additional layer extends.

25. The tunable optical filter of claim 21 in which the additional layer comprises a material having a non-linearity coefficient in the range of about $10^{-20}$ to $10^{-19}$ $m^2/W$.

26. The tunable optical filter of claim 21 in which the additional layer comprises a dye doped silica glass and the means for changing the refractive index of the additional layer is laser light launched into the additional layer in a direction transverse to the direction in which the additional layer extends.

27. The tunable optical filter of claim 26 in which the wavelength of the laser light is outside the wavelength range of about 1300 nm to 1700 nm, which is an operating band of the optical communication systems.

28. The tunable optical filter of claim 21 in which the additional layer is a polymer which exhibits a piezo-electric effect and the means for changing the refractive index of the additional layer is a voltage applied across the polymer to change the density thereof.

29. The tunable optical filter of claim 21 in which the spacing between the core-cladding interface and the cladding-additional layer interface is in the range of about 5 $\mu$m to 10 $\mu$m.

* * * * *

UNITED STATES PATENT AND TRADEMARK OFFICE
CERTIFICATE OF CORRECTION

PATENT NO. : 6,498,877 B1
DATED : December 24, 2002
INVENTOR(S) : Chowdhury Dipakbin Q. et al.

It is certified that error appears in the above-identified patent and that said Letters Patent is hereby corrected as shown below:

Column 7,
Line 66, insert -- 8. The tunable optical filter of claim 2 in which the -- instead of "8. The turnable optical filter of claim 2 in which the"

Column 8,
Line 50, insert -- direction transverse to the extent of the additional layer, the -- instead of "direction transverse to the extend of the additional layer, the"

Signed and Sealed this

Third Day of February, 2004

JON W. DUDAS
*Acting Director of the United States Patent and Trademark Office*